M. SCHMITT.
Sewer-Connection.
No. 225,424.    Patented Mar. 9, 1880.
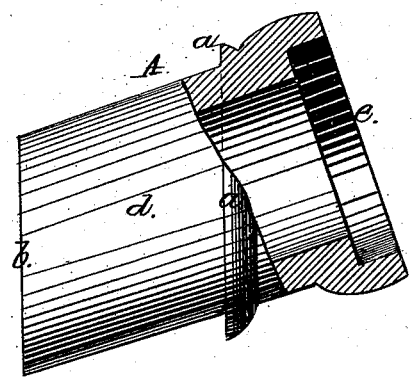
Fig: 1.
Fig: 2.
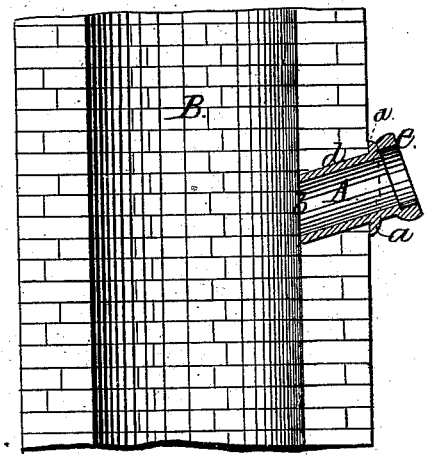
Fig: 3.
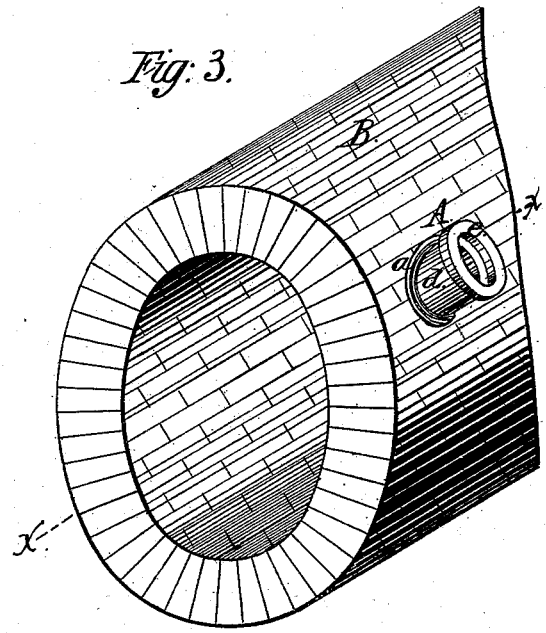
Witnesses:
John C. Tunbridge
Willy G. E. Schultz
Inventor:
Michael Schmitt
by his attorney
A. v. Briesen

UNITED STATES PATENT OFFICE.

MICHAEL SCHMITT, OF NEW YORK, N. Y., ASSIGNOR TO G. W. RADER & CO., OF SAME PLACE.

SEWER-CONNECTION.

SPECIFICATION forming part of Letters Patent No. 225,424, dated March 9, 1880.

Application filed January 24, 1880.

*To all whom it may concern:*

Be it known that I, MICHAEL SCHMITT, of New York, in the county and State of New York, have invented a new and Improved Sewer-Connection, of which the following is a specification.

My invention relates to an improved sewer-pipe to serve as a connection between a brick sewer and the branch sewer-pipes.

The invention consists in providing the said sewer-pipe with a diagonally or obliquely placed collar or flange next to its outer recessed end and parallel to the inner obliquely-cut end of said pipe, said obliquely-placed flange to serve as a stop to limit the insertion of the pipe within the sewer-wall, and to regulate the angular adjustment of the said pipe to the wall of the sewer.

The invention is more particularly intended for the application of the branch pipes to old sewers, which are frequently injured by ordinary branch pipes when the same are inserted too far or not placed at the proper angle.

In the accompanying drawings, Figure 1 is a sectional top view of my improved sewer-pipe. Fig. 2 is a horizontal section of a brick sewer with my improved sewer-pipe inserted through the side wall, said section being taken on line *x x* of Fig. 3; and Fig. 3 is a perspective view of a brick sewer with the improved sewer-pipe inserted in its wall.

Referring to the drawings, A represents the improved sewer-pipe for inserting through the wall of a main brick sewer, B, to serve as a connection between said sewer and the branch sewer-pipes leading from houses and other places. For this purpose, as is well known, pipes are run underground from the place to be drained to the street or main brick sewer, through the walls of which the end section of the sewer-pipe is passed at an acute angle to the direction in which the main sewer runs, so that the matter from the branch sewers is delivered into the main sewer in the same direction that the water and other matter flow through the main sewer, and thereby no difficulty is encountered by the matter from the branch sewers in entering the main sewer.

Owing to the want of a guide, it has been found difficult to insert the pieces through the sewer-wall the proper distance. Sometimes they are not thrust through far enough, but in the majority of cases they are thrust too far in, and the result is that the ends of so many pipes projecting inside the sewer seriously obstruct it.

In my improved pipe a flange or collar, $a$, is made upon the pipe obliquely—that is to say, at an angle corresponding to the angle at which the pipe enters the main sewer—and at such a point that between it and the end $b$ of the pipe is left a cylindrical part, $d$, of a length corresponding to the thickness of the sewer-wall on the oblique line of the pipe entering the sewer. The end $b$ of the pipe is parallel to the flange $a$, while the outside recessed end, $c$, into which the end of the first section of pipe from the main sewer is entered, is at right angles to the axis of the pipe.

When a branch sewer-pipe connection is to be made a hole is made through the wall of sewer B at the proper angle, and the pipe A is inserted in the hole so made, and pushed in until the flange $a$ comes in contact with the outside surface of the wall and stops its farther entrance, at which point its inner end, $b$, is flush with the inside surface of the sewer B, as clearly shown in Fig. 2. The sections of sewer-pipe are next connected with the projecting recessed end $e$ of pipe A in the usual manner, and as they are driven home the flange $a$ will serve to prevent the farther insertion of the pipe A into the sewer.

I claim—

The sewer-connection pipe A, provided with the oblique collar or flange $a$, parallel to the oblique inner angular end, $b$, of the pipe, but not parallel to the end $e$ of said pipe, substantially as herein shown and described.

MICHAEL SCHMITT.

Witnesses:
TOMPSON B. MOSHER,
WILLY G. E. SCHULTZ.